3 Sheets—Sheet 1.
H. V. HARTZ.
Machine for Preparing and Welding Pipe Joints.
No. 243,037. Patented June 14, 1881.
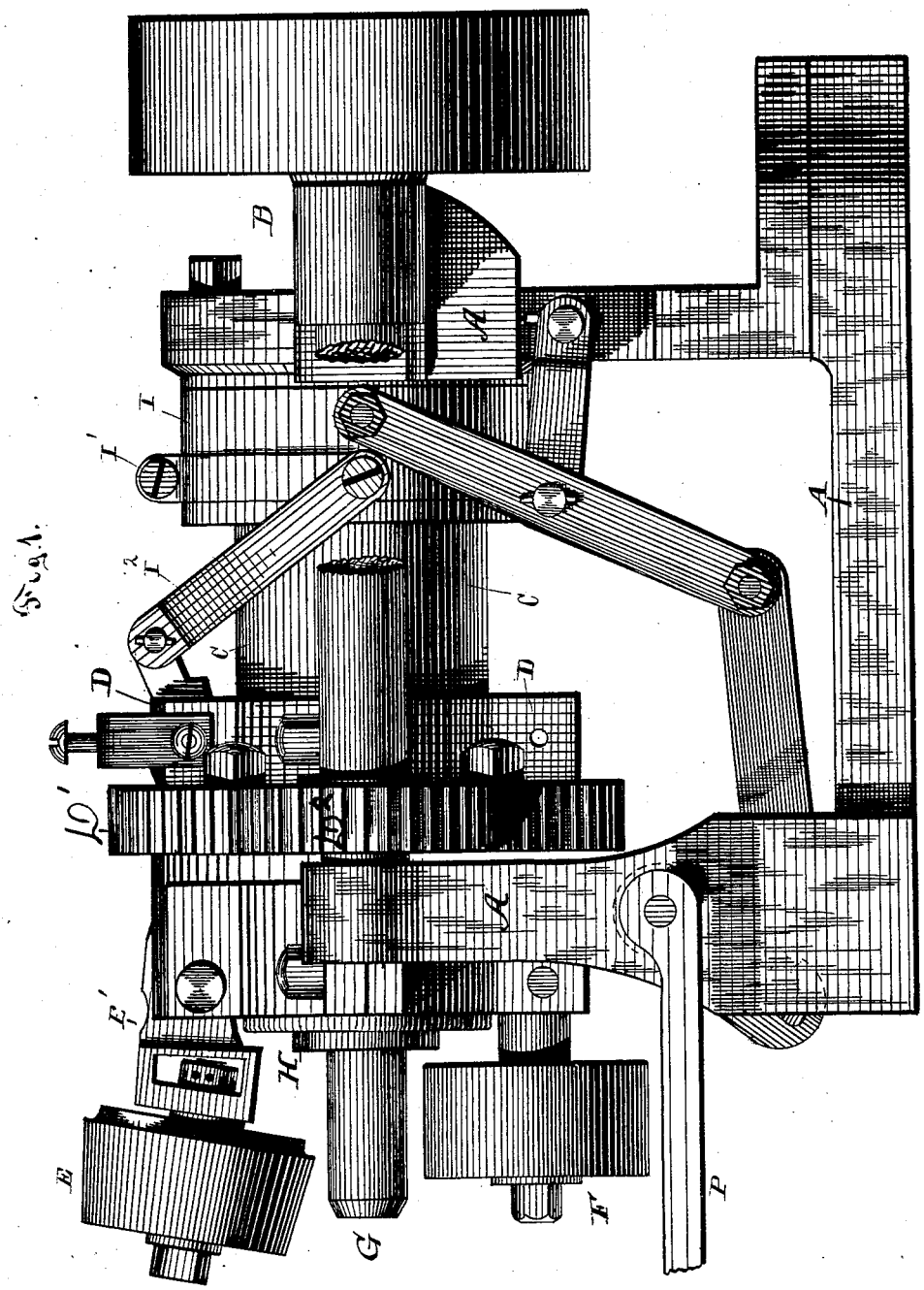
WITNESSES
Frank M. Faber
A. W. Bright
INVENTOR
H. V. Hartz.
By Leggett & Leggett
ATTORNEY

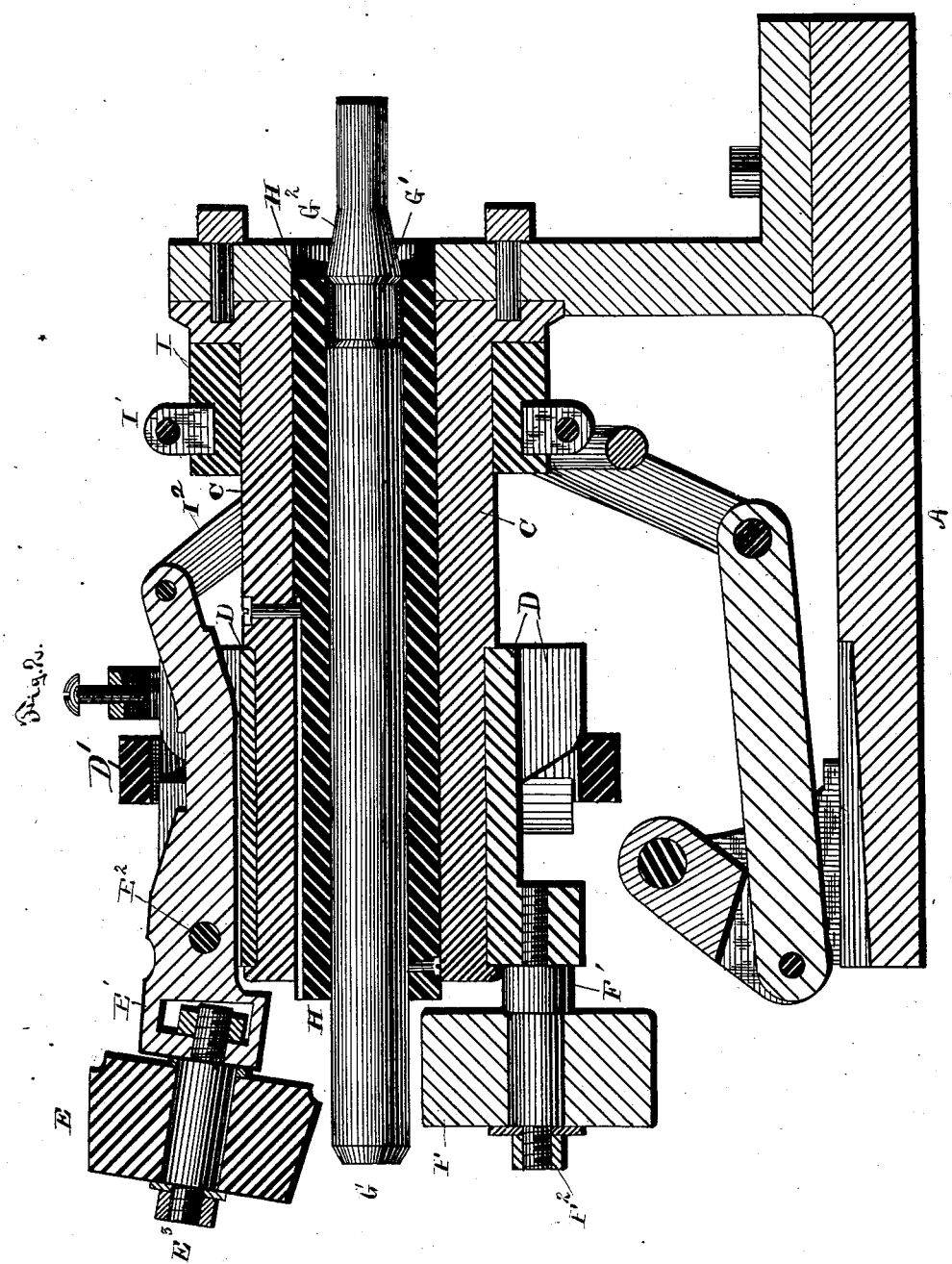

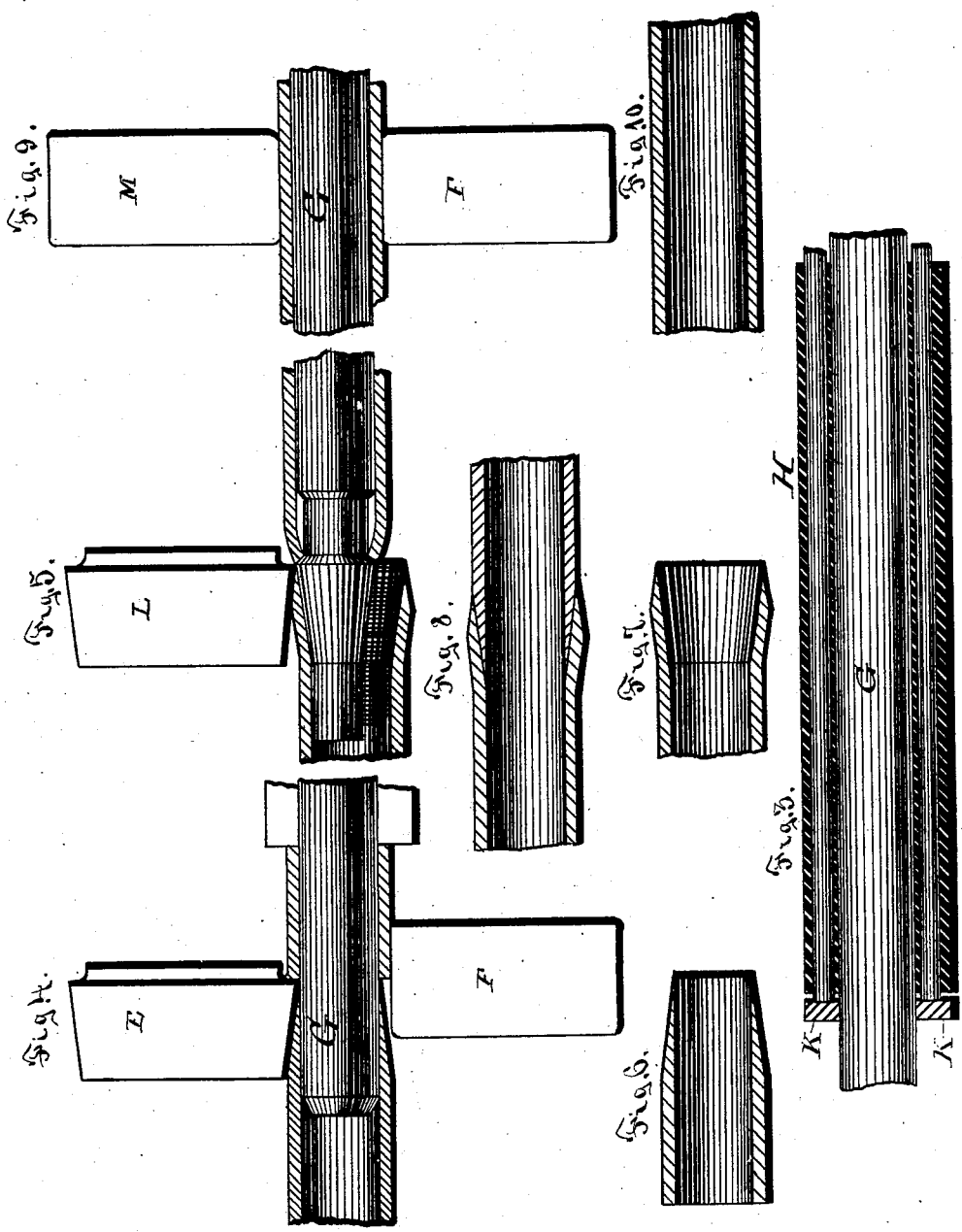

UNITED STATES PATENT OFFICE.

HENRY V. HARTZ, OF CLEVELAND, OHIO.

MACHINE FOR PREPARING AND WELDING PIPE-JOINTS.

SPECIFICATION forming part of Letters Patent No. 243,037, dated June 14, 1881.

Application filed December 22, 1879.

*To all whom it may concern:*

Be it known that I, HENRY V. HARTZ, of Cleveland, in the county of Cuyahoga and State of Ohio, have invented certain new and useful Improvements in Machines for Preparing and Welding Pipe-Joints; and I do hereby declare the following to be a full, clear, and exact description of the invention, such as will enable others skilled in the art to which it pertains to make and use it, reference being had to the accompanying drawings, which form part of this specification.

My invention consists in the parts and combination of parts hereinafter described and claimed.

In the drawings, Figure 1 is a view of my machine in side elevation. Fig. 2 is a vertical section of the same. Fig. 3 is a detached vertical section of the bushing which carries the mandrel. Fig. 4 is a detached vertical section of the rolls, mandrel, and pipe, showing the manner of forming the male portion of the pipe before welding. Fig. 5 is a vertical cross-section of the roll, mandrel, and pipe, showing the manner of forming the female portion of the pipe to be welded. Figs. 6 and 7 are detached views of the pipe, the ends respectively being prepared for union before welding. Fig. 8 represents a vertical section of the same pipe prepared as shown in Figs. 6 and 7, united preparatory for welding. Fig. 9 is a detached view of the rolls, mandrel, and pipe during the process of welding the joint, as shown in Fig. 8; and Fig. 10 is a vertical section of the pipe after the union has been completed.

In the said drawings, A represents any suitable frame for supporting the operative parts of my device.

B is the main driving-shaft of the machine, to which power is communicated through the pulley B'.

C is a central stationary hollow shaft, about which the sleeve D revolves, and upon which the sleeve I may be made to slide backward and forward. Upon this sleeve I is a collar, I', communicating with the roll E by means of the lever E' and bifurcated link I², and adapted to revolve with the sleeve D independent of the sleeve or collar I.

G is the mandrel or former, provided at one end with the recess G'. This mandrel may be made to closely fit the bushing H, or it may be made sufficiently small in relation to the bushing to permit the pipe to pass through the machine. It will only be necessary to be constructed in this manner when it is required to weld long sections of pipe. For all ordinary purposes, such as preparing boiler-flues and the like, the mandrel should be adapted to fit snugly in the bushing.

H is a removable bushing, whose outside measurement conforms to the diameter of the bore of the stationary shaft C, and the diameter of whose bore shall conform to the size of the mandrel, or of the pipe to be welded.

Sleeve D, supported by and revolving about the hollow stationary supporting-shaft C, carries with it the rollers E and F. The roll F revolves upon the stationary shaft F', which, in turn is attached to the sleeve D. This roll may be readily removed and another of a different shape, form, or size substituted. The roll E, with the stud upon which it revolves, is attached to the rocking lever E' in any suitable manner. By means of lever and bell-crank connection through the sleeve I, which can be readily understood from the drawings, the roll E is made to bear upon the mandrel G with any pressure desired, depending upon the power applied to the lever P.

Having thus described the construction of my invention, its operation is as follows: The machine, as shown in Fig. 2, is prepared to form the male end of the pipe to be welded. This is done by placing the pipe over the mandrel, as shown in Fig. 4. The machine is set in motion by power applied through the pulley B' and suitable gear-wheels, D' D². The sleeve D is made to revolve, carrying with it the rolls E and F. Power is now applied to the lever P, and the roll E is made to bear heavily upon the pipe, as shown in Fig. 4. After a few revolutions the end of the pipe will take the shape shown in Fig. 6. This completes the preparation of the male end of the pipe to be welded. To form the female end of the section the roll E is removed and the roll L substituted. The face of this roll is similar to that of roll E, with slightly less bevel. The mandrel is now reversed in the bushing, and the end of the pipe to be operated upon is placed upon the mandrel, as shown in Fig. 5 of the drawings.

The machine is again set in motion, the lever P again applied, which forces the roll L against the pipe, as shown in Fig. 5, when the end of the pipe will assume the shape shown in Fig. 7. The conoidal portion of the mandrel operates in connection with the roller L to form the internal bevel of the female section, which receives the external bevel of the male section. This operation of the machine is not a matter of conjecture, as I have demonstrated, by the practical use of a full-sized machine which I am now operating, the fact that the female end of the pipe can, by the mechanism and method specified, be given an internal bevel to receive the male section, as shown in Fig. 8. It is not necessary that the roll L should taper in the direction opposite from that shown in Fig. 5 of the drawings in order that it may have a bearing throughout its whole surface upon the tube. It is enough, as I have fully demonstrated by the working machine before mentioned, if such a bearing as indicated in Fig. 5 of the drawings be had, and such a construction will operate both to sever the fag-end of the tube and to form the new end, as specified. This operation may be performed with or without the roll F. The two pieces of pipe thus prepared are now united, as shown in Fig. 8, and heated to proper temperature for welding. The roll L is removed from the rocking shaft and the plain-faced roll M substituted. The machine is again set in motion; the pipe, heated at the joint, as indicated, is placed upon the mandrel, with the joint between the rolls M and F, as shown in Fig. 9; the power is applied to the lever P, when the roll M is made to bear heavily upon the pipe, which, after a few revolutions, will be found to be perfectly united, as shown in Fig. 10.

In order easily to remove the pipe from the mandrel after the weld is completed I have placed two or more rods, K, in the bushing H, as shown in Fig. 3. These are made to slide readily backward and forward. After the weld is completed the pipe may be driven from the mandrel by driving forward the rods K by means of a hammer, or in any other suitable manner.

In defining the relation of this application to another application filed by me August 26, 1880, I would state that I only claim in this application mechanism for preparing and welding the pipe-sections.

What I claim is—

1. In a machine for preparing and welding pipe-joints, the combination, with reversible mandrel G and bushing H, said mandrel being provided with conoidal portions $G^2$ and recess $G'$, of interchangeable rollers E and L, and mechanism for revolving said rollers around the mandrel, substantially as set forth.

2. In a machine for preparing and welding pipe-joints, the combination, with the mandrel, rotary sleeve D, fitted on stationary tubular shaft C, journal-bearing $F'$, rigidly secured to the sleeve, and a roller mounted on said bearing, of lever $E'$, pivoted to the sleeve, and provided with a journal-bearing, a roller mounted in the latter, and mechanism for operating the lever, substantially as set forth.

In testimony whereof I have signed my name to this specification in the presence of two subscribing witnesses.

HENRY V. HARTZ.

Witnesses:
WILLARD FRACKER,
JNO. CROWELL, Jr.